United States Patent
Lewis et al.

(10) Patent No.: US 9,788,589 B2
(45) Date of Patent: Oct. 17, 2017

(54) FLEXIBLE, FIBROUS ENERGY MANAGING COMPOSITE PANELS

(71) Applicant: University of Massachusetts, Boston, MA (US)

(72) Inventors: Armand F. Lewis, Mattapoisett, MA (US); Yong K. Kim, North Dartmouth, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 15/100,674

(22) PCT Filed: Dec. 1, 2014

(86) PCT No.: PCT/US2014/067883
§ 371 (c)(1),
(2) Date: Jun. 1, 2016

(87) PCT Pub. No.: WO2015/084709
PCT Pub. Date: Jun. 11, 2015

(65) Prior Publication Data
US 2016/0302507 A1   Oct. 20, 2016

Related U.S. Application Data

(60) Provisional application No. 61/911,180, filed on Dec. 3, 2013, provisional application No. 61/924,426, filed
(Continued)

(51) Int. Cl.
*A42B 3/06* (2006.01)
*B32B 3/26* (2006.01)
(Continued)

(52) U.S. Cl.
CPC ............. *A42B 3/063* (2013.01); *A42B 3/061* (2013.01); *A63B 71/10* (2013.01); *B32B 3/266* (2013.01);
(Continued)

(58) Field of Classification Search
CPC ........... D06N 7/0097; D06N 2203/041; D06N 2203/068; B32B 5/12; B32B 5/08; Y10T 428/23943; A42B 3/061; A42B 3/063
See application file for complete search history.

(56) References Cited

U.S. PATENT DOCUMENTS 2,019,186 A    10/1935  Kaiser
2,187,140 A *  1/1940   Faris ...................... B32B 25/10
                                                            15/217

(Continued)

FOREIGN PATENT DOCUMENTS

KR    10-2008-000340 A    1/2008
WO       2004012933 A1    2/2004
WO       2012087406 A2    6/2012

OTHER PUBLICATIONS

International Search Report, PCT/US2014/067883, Mar. 31, 2015, pp. 12.
(Continued)

*Primary Examiner* — Cheryl Juska
(74) *Attorney, Agent, or Firm* — Chapin IP Law, LLC

(57) ABSTRACT

A flexible, fibrous energy managing composite panel includes multiple flocked energy absorbing material (FEAM) layers separated by dividers. The FEAM layers can be single side or double side and can be fabricated from monofilament fibers having different properties (e.g., length and denier) flocked onto various substrates. The dividers can include sheets, fabrics, films, foam, spacer fabrics to separate the flock fibers in adjacent layers. The composite panels can be processed for breathability and flexibility. Other
(Continued)

embodiments include piezoelectric FEAM layers and dividers for electronic sensing applications, and application of composite panels to body armor and the outer shells of helmets.

16 Claims, 9 Drawing Sheets

Related U.S. Application Data on Jan. 7, 2014, provisional application No. 61/932,930, filed on Jan. 29, 2014.

(51) Int. Cl.

| | | |
|---|---|---|
| D06N 7/00 | (2006.01) |
| F41H 5/04 | (2006.01) |
| D04H 11/00 | (2006.01) |
| B32B 5/02 | (2006.01) |
| B32B 5/18 | (2006.01) |
| B32B 5/24 | (2006.01) |
| B32B 5/26 | (2006.01) |
| F41H 1/08 | (2006.01) |
| A63B 71/10 | (2006.01) |
| A63B 71/08 | (2006.01) |

(52) U.S. Cl.
CPC ............ *B32B 5/022* (2013.01); *B32B 5/024* (2013.01); *B32B 5/026* (2013.01); *B32B 5/18* (2013.01); *B32B 5/245* (2013.01); *B32B 5/26* (2013.01); *D04H 11/00* (2013.01); *D06N 7/0097* (2013.01); *F41H 1/08* (2013.01); *F41H 5/0478* (2013.01); *A63B 71/08* (2013.01); *B32B 2262/0253* (2013.01); *B32B 2262/0261* (2013.01); *B32B 2262/0276* (2013.01); *B32B 2307/554* (2013.01); *B32B 2307/56* (2013.01); *B32B 2307/724* (2013.01); *B32B 2307/7265* (2013.01); *D06N 2203/041* (2013.01); *D06N 2203/068* (2013.01); *Y10T 428/23943* (2015.04)

(56) References Cited

U.S. PATENT DOCUMENTS

| | | | | |
|---|---|---|---|---|
| 2,303,203 A * | 11/1942 | Faris | ............ | B32B 5/06 |
| | | | | 156/148 |
| 2,317,595 A * | 4/1943 | Faris | ............ | D04H 11/00 |
| | | | | 156/279 |
| 2,425,235 A | 8/1947 | Ferrante | | |
| 2,425,236 A | 8/1947 | Ferrante | | |
| 2,478,097 A | 8/1949 | Glanzer | | |
| 2,945,557 A | 7/1960 | Powers | | |
| 2,999,763 A * | 9/1961 | Sommer | ............ | D04H 11/00 |
| | | | | 427/206 |
| 3,018,845 A | 1/1962 | Powers | | |
| 3,215,584 A * | 11/1965 | McConnell | ............ | D04H 11/00 |
| | | | | 15/209.1 |
| 3,496,054 A * | 2/1970 | Baigas, Jr. | ............ | D04H 11/00 |
| | | | | 156/72 |
| 3,583,890 A * | 6/1971 | Klockmann | ............ | A47G 27/0412 |
| | | | | 156/279 |
| 3,772,132 A * | 11/1973 | Dulin, Jr. | ............ | D04H 11/00 |
| | | | | 156/72 |
| 3,815,341 A | 6/1974 | Hamano | | |
| 3,828,934 A | 8/1974 | Green et al. | | |
| 3,860,469 A | 1/1975 | Gregorian et al. | | |
| 3,961,115 A | 6/1976 | Klein | | |
| 3,961,116 A | 6/1976 | Klein | | |
| 4,016,317 A | 4/1977 | Kalwaites | | |
| 4,078,106 A | 3/1978 | Lind | | |
| 4,092,246 A | 5/1978 | Kummer | | |
| 4,246,308 A | 1/1981 | Walsh | | |
| 4,297,404 A | 10/1981 | Nguyen | | |
| 4,461,791 A | 7/1984 | Matsui et al. | | |
| 4,515,845 A * | 5/1985 | Annis | ............ | F16F 7/00 |
| | | | | 188/266 |
| 4,622,253 A | 11/1986 | Levy et al. | | |
| 4,636,417 A | 1/1987 | Rasmussen | | |
| 4,699,818 A | 10/1987 | Evans et al. | | |
| 4,758,453 A | 7/1988 | Challet et al. | | |
| 4,847,133 A | 7/1989 | Foxman | | |
| 4,908,128 A | 3/1990 | Chiba | | |
| 5,047,103 A | 9/1991 | Abrams et al. | | |
| 5,219,469 A | 6/1993 | Binzer et al. | | |
| 5,389,247 A | 2/1995 | Woodside | | |
| 5,543,194 A | 8/1996 | Rudy | | |
| 5,985,148 A | 11/1999 | Liu | | |
| 6,060,145 A | 5/2000 | Smith et al. | | |
| 6,103,641 A | 8/2000 | Ghering, Jr. | | |
| 6,159,372 A | 12/2000 | Yang | | |
| 6,365,258 B1 * | 4/2002 | Alm | ............ | A47G 27/0468 |
| | | | | 156/304.7 |
| 6,602,407 B2 | 8/2003 | Talbot et al. | | |
| 6,692,811 B1 | 2/2004 | Lasko | | |
| 8,533,869 B1 | 9/2013 | Capuano | | |
| 8,850,692 B2 * | 10/2014 | Han | ............ | B26D 1/0006 |
| | | | | 29/700 |
| 9,321,218 B2 * | 4/2016 | Han | ............ | B29C 70/10 |
| 9,446,413 B2 * | 9/2016 | Blanchard | ............ | B02C 17/00 |
| 2001/0008039 A1 | 7/2001 | Alboom et al. | | |
| 2002/0023871 A1 | 2/2002 | Talbot et al. | | |
| 2003/0082335 A1 * | 5/2003 | Clyne | ............ | B32B 7/04 |
| | | | | 428/86 |
| 2004/0137190 A1 | 7/2004 | Lasko | | |
| 2004/0171321 A1 | 9/2004 | Plant | | |
| 2005/0014437 A1 | 1/2005 | Yoshida | | |
| 2006/0228967 A1 | 10/2006 | Gladfelter | | |
| 2007/0289688 A1 | 12/2007 | Abrams | | |
| 2008/0193709 A1 * | 8/2008 | Han | ............ | B29C 70/10 |
| | | | | 428/100 |
| 2008/0274326 A1 | 11/2008 | Kim et al. | | |
| 2010/0028552 A1 * | 2/2010 | Stieber | ............ | B05B 5/08 |
| | | | | 427/462 |
| 2011/0209595 A1 * | 9/2011 | Han | ............ | B26D 1/0006 |
| | | | | 83/663 |
| 2012/0177861 A1 | 7/2012 | Eleazer et al. | | |
| 2012/0186002 A1 | 7/2012 | Bhatnagar et al. | | |
| 2013/0115408 A1 | 5/2013 | Abrams et al. | | |
| 2013/0122256 A1 | 5/2013 | Kleiven et al. | | |
| 2013/0298317 A1 | 11/2013 | Fonte et al. | | |
| 2013/0330502 A1 | 12/2013 | Lewis et al. | | |
| 2016/0243787 A1 * | 8/2016 | Han | ............ | B29C 70/10 |

OTHER PUBLICATIONS

Brady, S., et al., "Wearable Sensors? What is There to Sense?", Studies in Health and Informatics, 117:80-88 (2005).

Dunne, L.E., et al., "Initial Development and Testing of a Novel Foam-Based Pressure Sensor for Wearable Sensing", Journal of NeuoEngineering and Rehabilitation, 2(4): 7 pages, (2005).

Liu, Y., et al., "Compression Behavior of Warp-Knitted Spacer Fabrics for Cushioning Applications", Textile Research Journal, 11 pages, Aug. 2, 2011, downloaded from URL:http://trj.sagepub.com/content/early/2011/07/31/0040517511416283.

Qiao, P., et al., "Impact Mechanics and High-Energy Absorbing Materials: Review", Journal of Aerospace Engineering, 21(4):235-248 (2008).

Torg, MD, J.S., et al., "Retrospective Report on the Effectiveness of a Polyurethane Football Helmet Cover on the Repeated Occurrence of Cerebral Concussioins", The American Journal of Orthopedics, 28(2):128-132 (1999).

Notification of Transmittal of the International Search Report and the Written Opinion of the International Searching Authority for PCT/US2016/020341, "Structured Flock Fiber Reinforced Layer", date of mailing Jul. 25, 2016.

* cited by examiner

FLEXIBLE, FIBROUS ENERGY MANAGING COMPOSITE PANELS

FIELD OF THE INVENTION

The invention relates to energy absorption panels for cushioning and detecting mechanical impact loads and use of these panels in sports and military protective gear including helmets and apparel.

BACKGROUND

The need for energy absorbing padding to cushion mechanical impact loads is present in many environments. For example, personal protection equipment such as helmets, shin guards and body part protectors typically include some form of cushioning layer. The type of helmet commonly used in football (i.e., American football), for example, has a hard outer shell that generally is molded of impact resistant plastic such as acrylonitrile butadiene styrene (ABS) or polycarbonate. The interior of the helmet is lined with various components that may be formed, for example, from various materials such as felt, fibrous knits, foam-padding material such as ethylene vinyl acetate, vinyl nitrile or urethane/rubber. Inflatable shaped air bladders are also commonly used in sports helmets. The liner is included in the design of the helmet and functions to provide some cushioning of direct physical head impacts during active play.

Presently, much research and development as well as medical studies are on-going on the effects sport action has on injurious head impact and Traumatic Brain Injury (TBI) including concussions. New sport helmet designs and helmet padding materials are constantly being investigated in the context of mitigating the effect of head impact occurrences and their severity in the contact sports. Along with this is the concept of employing sensors in these sport helmets (e.g., American Football) that would be able to detect sport injury impact "strike" or "hit" intensity and direction of impact.

Other environments where high impact forces are present are those involving body armor. For example, bulletproof vests typically are fabricated from polyaramid (Kevlar®), ultra high molecular weight polyolefin fibers, woven or mat fabrics having high impact and cut resistance. When struck by a projectile, these vests and similar clothing can impress a direct force on the wearer's body area that, while potentially life-saving, can cause significant bodily bruising and/or a bone fracturing injury if not properly cushioned against the body.

In practice, textile based spacer fabrics (by themselves) are presently considered to be breathable alternatives to Foam in Impact Energy (Helmet and Body pad) applications. For example, a product like DEFLEXION® is a textile structure type spacer fabric product that was being produced and marketed by Dow Corning Corp for ski-jacket padding. Also, Hong Kong Polytechnic University has been studying spacer fabrics for motorcycle helmet padding applications.

It is desirable in these and in other environments where impact forces are involved that the helmet or protective garment be comfortable and in some applications, that it has the ability to allow airflow between the user's body and the helmet or protective garment. It also is desirable to provide a liner construction adapted for use in such environments that is reasonably flexible, can be formed into various shapes, displays an energy absorbing compression function, can be worn close to the body and enables airflow between the body and the protective helmet or garment.

There is a need in sport and military helmet design to develop a helmet pad material device that would be able to detect and/or record and/or transmit signals that sense the intensity, location and duration of a mechanical "hit" to a helmet or protective body apparel. The concept of detecting and sensing mechanical impact strikes would also apply to biomedical sensors such as noncontact ECG sensors, respiratory sensors, sport and military body protection apparel systems. Polymeric body sensors have been described in "Wearable sensors;" Sarah Brady, et al., Studies in Health Technology and Informatics, Volume 117, pp 80-88 (2005).

A study of polyurethane rubber covers that have been applied to the outside of football helmets has been reported in "Retrospective report on the effectiveness of a polyurethane football helmet cover on the repeated occurrence of cerebral concussions," by Torg, et. al., Am. J. Orthop (Belle Mead N.J.) 1999; 28(2):128-32.] In the 1990's, when these tests were carried out, it did not seem that football helmet covers provided any protection against recurring concussions. However, this study was tainted by uncertainties in the fact that the human subjects in the study had already suffered concussions. It is well known that athletes with a history of concussions are significantly more prone to new concussions than players with no previous history of concussions. However, this study has not curbed the idea of using football helmet covers in high school football practice sessions and other non-league scrimmages. There are presently at least two sporting goods companies, Champion and Guardian who presently have football helmet cover products on the market. In fact, many high school football programs have adopted using these helmet covers in practice. The overall use of such covers in actual competition has not yet caught on. In this context, there seems to be a potential opportunity for other means of accomplishing outside-the-helmet shell impact blunting technology.

It is desirable in these and in other environments where impact forces are involved that the helmet or protective garment be comfortable and in some applications, that the garment has the ability to allow airflow between the user's body and the helmet or protective garment. It also would be desirable to provide a liner construction adapted for use in such environments that is flexible, can be formed in various shapes, displays an energy absorbing compression function, can be worn close to the body and may enable airflow between the body and the protective helmet or garment. Traumatic Brain Injury (TBI) and concussion causing head strikes in sports, especially football and hockey, are a topic of great contemporary concern to the professional, collegiate, high school and other youth sports groups. Concern about long term health effects of head strikes has now reached dramatically high social and legal interest levels. Therefore, any ideas put forth on ways of mitigating damaging head injuries in sports are welcome to all of society and especially the sports industry. In all sport helmet designs, fabrications and structures, the inside of the helmet is almost always fitted with energy absorbing pads, foam, air bladders, felt and other fibrous materials such as spacer fabric textile structures.

There are some conventional systems that use flocked fibers on the outside of sport helmets for horse riding and polo sports. However, flocked polo helmets are mainly for aesthetic effect; outside of helmet flocking with black fibers results in a non-glare, light absorbing, non-reflecting helmet surface. Also, some of these riding helmets use simple single side flocked inner linings to provide some against-the-head comfort. However in this case there is no mention of the helmet's impact energy absorbing capability. Furthermore, these flocked polo helmets do not indicate they have the proper type of flock material or coating configuration that will be needed for impact energy absorption. It is noted that in the equestrian sports, the issue of head injury is also important.

Currently, head protection in American football is in the form of a shaped, hard/tough molded plastic helmet whose interior is fitted with energy absorbing pads and the like. In this scenario, an impact strike (e. g. helmet-to-helmet) will first hit the hard plastic helmet shell—this kinetic energy will then be transferred to the inside positioned helmet pads which are there to absorb energy before in reaches the wearer's head. These interior pads function to lower the impact energy of this outside-the-helmet hit to a minimum level. This hit-to-the-head is presently blunted by only the interior helmet pad system. Since the hard plastic helmet material does not absorb much of a hit's kinetic energy, it is the helmet's interior pad system that is responsible for absorbing most of this impact energy. In fact the hard plastic helmet can sometimes serve as a conduit for spreading a strike's impact energy throughout the whole helmet.

SUMMARY

A flocked energy absorbing material (FEAM) layer and corresponding FEAM panel as disclosed herein generally comprises fibers flocked onto a central support layer. In some embodiments incorporating two or more FEAM elements stacked or layered together, a divider (e.g., a thin, light weight separator fabric, sheet and/or film) is generally placed between the layers to prevent two adjacent FEAM flocked surface layers from having their flocked fiber filaments from becoming inter-meshed. In other embodiments, foam layers and perforated foam layers are used as dividers. In still other embodiments, textile structured spacer fabrics are used as dividers. Textile based spacer fabrics are generally woven, warp knitted or weft knitted fibrous structures that have a measurable thickness and having a structured monofilament interconnecting core that is intermeshed or interlaced into top and bottom surface layers of the knitted or woven spacer fabric. Warp Knitted Spacer Fabrics (WKSF) are an example of a breathable energy absorbing fibrous structure. Combined with FEAM layer technology, these multi-layer composite panel designs are a breathable and effective helmet and body pad material structure.

In some embodiments, the synergy of FEAM/Spacer fabric and FEAM/Foam layer combinations is strongly demonstrated when FEAM layers are combined with special spacer fabric or foam layers. Significant improvements in impact EA properties are found in these combinations. Furthermore, there appears to be a surprising and unknown "coupling" feature when combining FEAM layers with certain Warp Knitted Spacer Fabric (WKSF) structures. The inherent EA properties of WKSF elements do not seem to translate directly into the final impact properties of these FEAM/WKSF combinations. Experiments have shown that WKSF materials (alone) that have lower impact energy absorbing EA properties were found to have the higher impact (EA) properties when they are combined with certain FEAM layers.

In one embodiment, a flexible, fibrous energy managing composite panel includes a plurality of Flocked Energy Absorbing Material (FEAM) layers, each layer including a substrate having a first surface, a multiplicity of monofilament fibers, each having a first end and a second end, the fibers being attached, at their first ends to the first surface of the substrate with the second ends of the fibers extending away from the first surface of the substrate. The composite panel further includes at least one divider disposed between two layers of the plurality of FEAM layers. Such multi-layer FEAM panels provide a high Force Loss/thickness property characteristically comparable to conventional FOAM materials while also providing composite panels that are relatively thin and flexible compared to conventional materials. FEAM multi-layer composite panels may be used as direct impact absorbing devices or may be used in conjunction with other devices, such as the cushioning materials commonly found in helmet padding and the like. In other embodiments, the FEAM substrate can be made from a polyester nonwoven fabric, a polyamide nonwoven fabric, a woven polyester fabric, a woven polyamide fabric, a knitted polyester fabric or a knitted polyamide fabric. In embodiments disclosed herein, the monofilament flock fibers that are used to create the FEAM layers have a fineness in a range of about 1 denier to about 60 denier and a length between about 0.5 mm to about 12 mm. In these embodiments, the monofilament fibers, include but are not limited to, polyamide fibers, polyolefin fibers and polyester fibers.

In another embodiment the panel further includes an outer wrapping fabric to cover a surface of at least one of the plurality of FEAM layers. The outer wrapping fabric includes one of: a woven polyester fabric, a woven polyester fabric having at least one napped surface, a woven polyamide fabric having at least one napped surface, a flexible knitted spacer fabric having at least one napped surface, a flexible woven spacer fabric having at least one napped surface, a polyester fabric with having at least one terrycloth surface and a polyolefin fabric having at least one napped surface. In yet another embodiment, the outer wrapping fabric includes a smooth surface disposed towards a wearer of the panel. In one embodiment, the outer wrapping fabric includes flannel.

In another embodiment the FEAM layers can include a second multiplicity of monofilament fibers, each having a first end and a second end, the fibers being attached, at their first ends to a second surface of the substrate with the second ends of the fibers extending away from the second surface of the substrate. These FEAM layers are referred to as double side flock or dual flock FEAM layers.

A further embodiment incorporates double side flock FEAM layers having a second multiplicity of monofilament fibers having different lengths and/or denier properties than the first multiplicity of monofilament fibers. These FEAM layers (referred to as dual size FEAM layers) have been found to be useful in some special impact mitigation body pad configurations. Such a FEAM construction is useful in the fabrication of body armor pads and sheets where the soft-flock layer side of the dual size flock FEAM panel is positioned against the body.

FEAM layers and panel constructions can also be adapted for electronic sensing and mechanical impact detecting instrumentation. One embodiment incorporates a divider which includes a flexible, electro-active material (EAM) layer. In another embodiment, the monofilament fibers in at least one FEAM layer include electro-active material (EAM) flock fibers.

In still another embodiment, the divider can be made from a polyester woven fabric, a polyamide woven fabric, a thin polymer film fabric, a thin nonwoven fabric, a foam layer, a knitted spacer fabric, a woven spacer fabric or a felt layer. In particular, warp knitted spacer fabrics (WKSF) dividers provide significant improvements in impact EA properties.

In another embodiment, the substrate includes a plurality of perforations with an open area for the plurality of perforations being less than about 30 percent of the area of the substrate. In another embodiment, the perforations are disposed in a staggered pattern with less than about 12.7 mm separation and have a circular diameter less than about 6.4 mm. In yet another embodiment, each of the FEAM layers is non-barbed-needle punched. In still another embodiment, a plurality of slits is placed in the FEAM layers, this plurality of slits may be spaced apart from and within a perimeter edge of the panel.

In another embodiment, one of the FEAM layers has a substrate comprising an outer surface of a helmet shell outer surface, second ends covered by a flexible sheet that is impregnated with an abrasion resistant coating and a low friction surface coating disposed on the abrasion resistant coating on the flexible sheet. In another embodiment, an integrally flocked, impact absorbing outside covering system for a sport helmet includes a helmet shell having an outer surface, a plurality of flock fibers having first ends disposed on the outer surface of the helmet shell and second ends, a flexible sheet that is impregnated with an abrasion resistant coating at least partially covering the second ends and a low friction surface coating disposed over the abrasion resistant coating on the flexible sheet.

A method for making a flexible, fibrous energy managing composite panel includes processing a plurality of FEAM layers to provide breathability and flexibility, assembling the plurality of FEAM layers and at least one divider disposed between two adjacent FEAM layers in a stacked configuration and interleaving at least one divider between adjacent one of the plurality of FEAM layers. This technique works with both single side and double side flocked FEAM layers. This technique further includes processing the plurality of FEAM layers to provide breathability and flexibility by slitting the plurality of FEAM layers, needle punching the plurality of FEAM layers, needle punching at least one divider or perforating a substrate of each of the plurality of FEAM layers.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

Combinations of multiple FEAM layers and fabric, sheet, film, spacer fabric and foam dividers form very effective, flexible, fibrous energy managing composite panel for impact force and energy absorption applications. A synergistic effect has been discovered in some FEAM/spacer fabric and FEAM/foam embodiments, namely, that the percentage force losses upon mechanical impact of certain types of combined/layered FEAM/divider composite panels are higher than the percentage force loss of each of the individual components.

Figure 1:
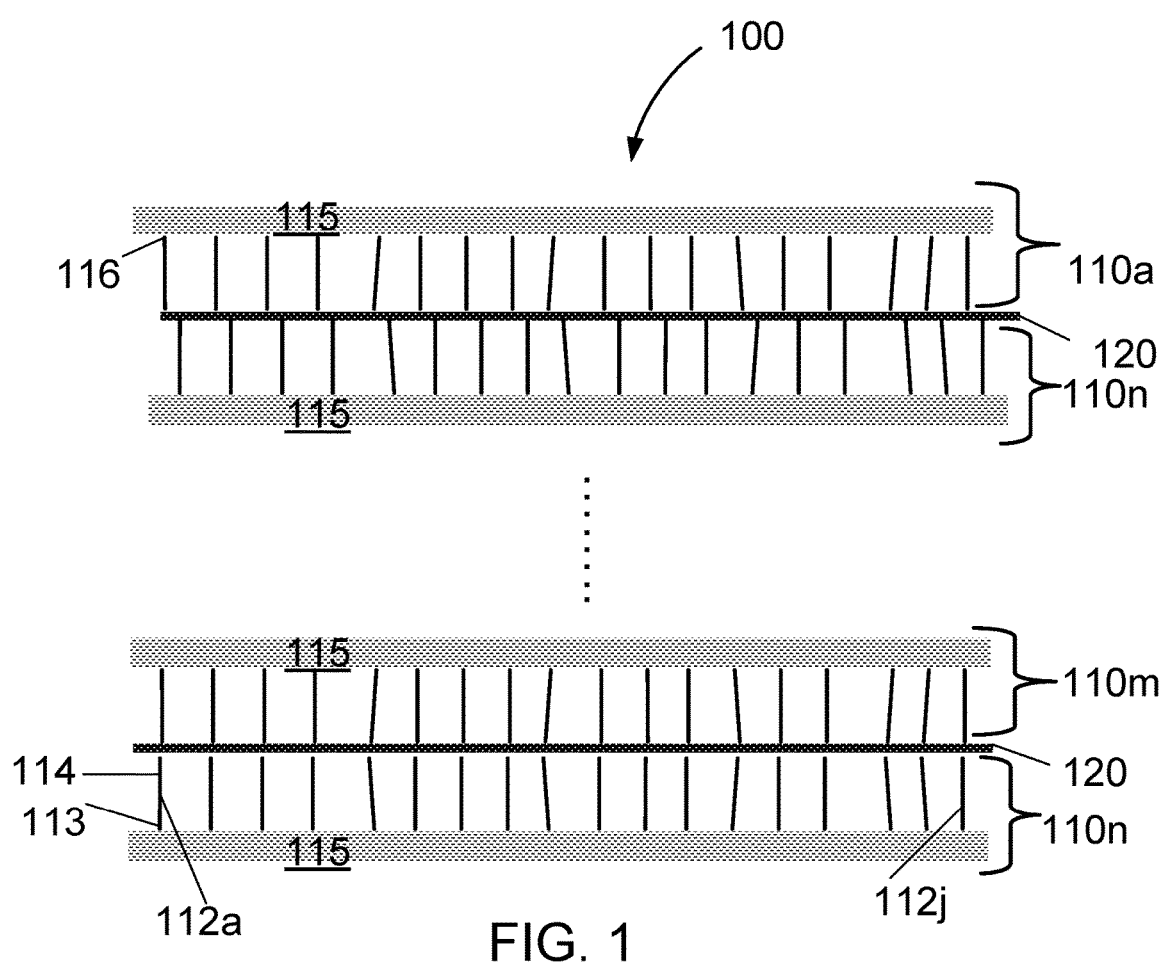
FIG. 1 is a schematic diagram of a fibrous energy managing composite panel in accordance with one example embodiment disclosed herein.

Now referring to FIG. 1, an exemplary flexible, fibrous energy managing composite panel 100 (also referred to as a FEAM pane 100) includes a plurality of flocked energy absorbing material (FEAM) layers 110a-110n (commonly referred to as FEAM layers 110 or flocked FEAM layer). Here, each single side flocked FEAM layer 110 includes a substrate 115 having a first surface 116, a multiplicity of monofilament fibers 112a-112j, each having a first end 113 and a second end 114, the fibers being attached, at their first ends 113 to the first surface 116 of the substrate 115 with the second ends 114 of the fibers extending away from the first surface 116 of the substrate 115. The panel 100 further includes at least one divider 120 (e.g., fabric, sheet, foam, spacer fabric or film) disposed between two layers (i.e., the divider separates the loose ends of the flocked fibers of two adjacent FEAM layers) of the plurality of FEAM layers, here FEAM layers 110m and 110n. It is understood that the single side FEAM layers can be arranged (e.g., stacked) face-to-face (i.e., two single-side flocked positioned to face each other flock side to flock side) as shown in FIG. 1, back to front (e.g., with a divider or where the substrate 115 serves as a divider, or back to back (e.g., with two substrates adjacent each other).

The substrate 115 includes, but is not limited to, a polyester nonwoven fabric, a polyamide nonwoven fabric, a woven polyester fabric, a woven polyamide fabric, a knitted polyester fabric and a knitted polyamide fabric. In various embodiments, the monofilament flock fibers 112 each have a fineness in the range of about 1 denier to about 60 denier and a length between about 0.5 mm to about 12 mm. The monofilament fibers 112 include, but are not limited to, polyamide fibers, polyolefin fibers and polyester fibers. In one embodiment, an adhesive is used to bond the monofilament fibers 112 onto the substrate 115.

When laying or plying together two or more FEAM layers 110 in forming the composite panel 100 the divider 120 (e.g., separator sheet or layer of thin fabric) is placed between the ends of the flock fibers of adjacent FEAM layers. This divider 120 is used to prevent the intermeshing of the contiguous FEAM layers 110. It was experimentally determined that multi-layer FEAM panels without separators had lower percentage Force Loss properties in Ball-Drop impact tests. In the −20° C. to +60° C. temperature range, the Impact Force/Energy properties of FEAM panels disclosed herein do not change greatly with temperature variations compared to conventional FOAM materials. Additionally, FEAM panels have excellent "multiple hit," material recovery properties (i.e., much better than any of the foam only materials tested).

In one embodiment, the stacked FEAM layers 110, interleaved dividers 120, and an outer wrapping fabric (shown below) are secured together into the final flexible, fibrous energy managing composite panel 100 by sealing or sewing the perimeter of the components of the panel 100 to hold the panel 100 together. Perimeter sewing can be accomplished by sewing a simple straight stitch or a designed double stitch around the edges of the panel. Double stitching can be accomplished using, for example, a Serger type sewing machine which is designed to sew a double "box-like" stitch to secure the panel 100. A Serger machine stitch is commonly used to produce a clean and secure edge-finishing stitch when securing the edges of a multiple layer fabric or fibrous materials. Alternatively, sealing the edges of the panel 100 can be accomplished using a suitable adhesive such as a polyurethane or acrylic based adhesive. In another embodiment, heat sealing the perimeter is used to secure the panel 100. If the composite panel 100 includes thermoplastic fiber material, the perimeter of the panel can be heat, microwave or ultrasonically sealed or bonded. Heat, microwave and ultrasonic sealing and bonding techniques are known in the art of industrial fabric assembly. In another embodiment, spot stitching is used to stabilize the interior of composite panels. Through-the-panel simple short stitches are sewn into the panel at various spots similar to quilting. This "spot quilting" is useful to stabilize large area FEAM composite panels.

Figure 2:
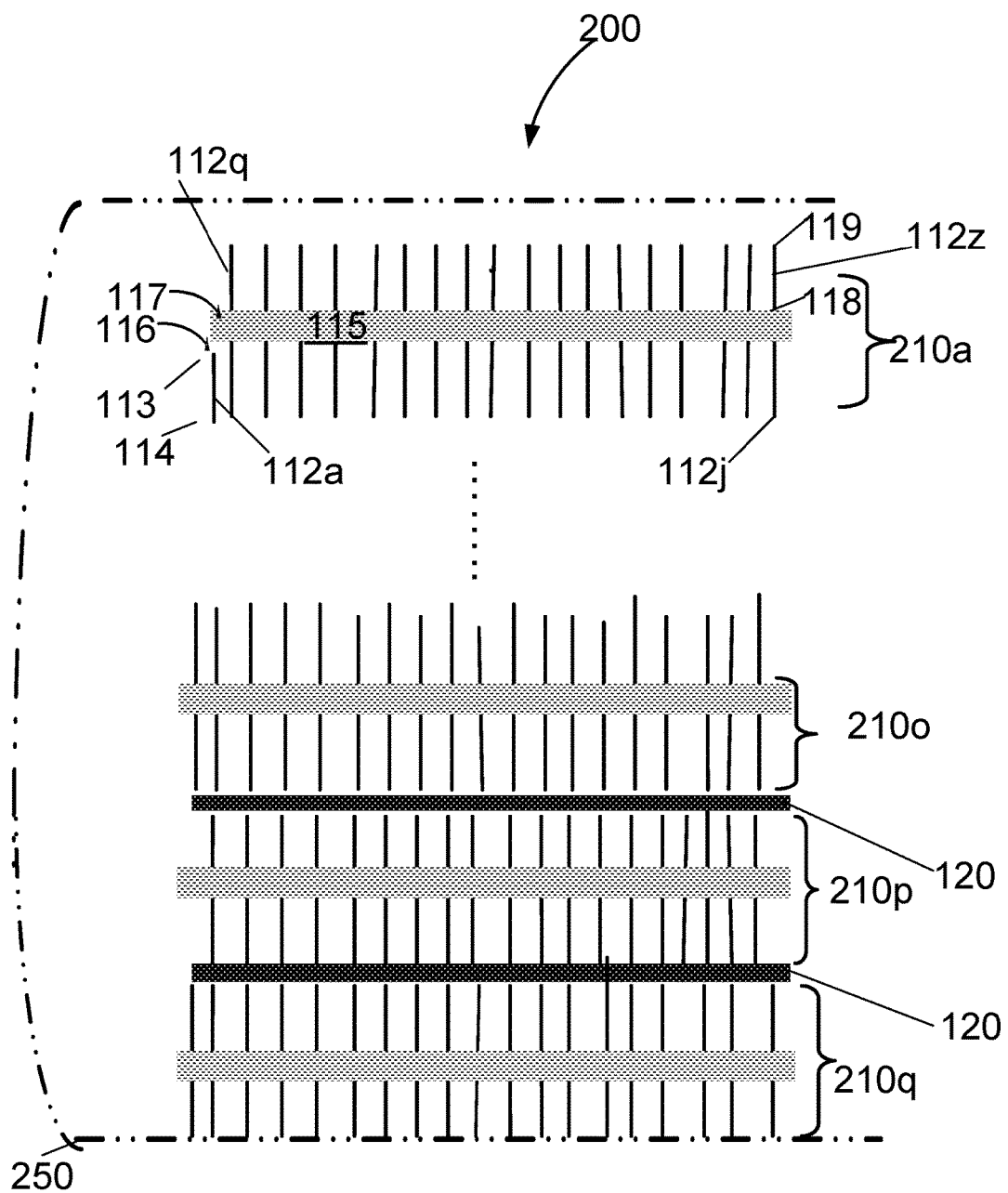
FIG. 2 is a schematic diagram of an alternate embodiment of the composite panel of FIG. 1 having double side FEAM layers and an outer wrapping fabric.

Now referring to FIG. 2, a flexible, fibrous energy managing composite panel 200 similar to panel 100 of FIG. 1 includes double side flocked FEAM layers 210a-210q (referred to commonly as double side FEAM layers 210, double side FEAM layers 210, or dual FEAM layers 210). The double-side flocked FEAM layers 210 are similar to FEAM layers 110, but include a second multiplicity of monofilament fibers 112q-112z, each having a first end 118 and a second end 119, the fibers 112 being attached, at their first ends 118 to a second surface 117 of the substrate 115 with the second ends 119 of the fibers extending away from the second surface 117 of the substrate 115.

In one embodiment, multiple of double side FEAM layers 210 are stacked together and separated with dividers 120 (e.g., sheets, fabrics, films etc.). In another embodiment, the composite panel 200 also includes an outer wrapping fabric 250 disposed to cover at least one surface of at least one FEAM layer 210. In other embodiments, the outer wrapping fabric 250 completely surrounds the composite panel 200. The outer wrapping fabric 250 includes, but is not limited to a woven/knitted polyester fabric, a woven/knitted polyester fabric having at least one napped surface, a woven/knitted polyamide fabric having at least one napped surface, a thin, flexible knitted spacer fabric having at least one napped surface, a thin, flexible woven spacer fabric having at least one napped surface, a polyester fabric having at least one terrycloth surface and a polyolefin fabric having at least one napped surface. In one embodiment, the outer wrapping fabric 250 surrounds the entire composite panel 200. In another embodiment, the outer wrapping fabric 250 comprises a smooth surface disposed towards a wearer of the panel to provide a more comfortable surface (e.g., next to the wearer's skin). An in yet another embodiment, the outer wrapping fabric 250 comprises a surface to accommodate the hook portion of a loop and hook closure (e.g., Velcro® Veltex® fabric). In another embodiment, the outer wrapping layer fabric 250 comprises a layer of thin (about 2 mm (0.079") to about 6 mm (0.236") thick) spacer fabric textile structure one side of which has a napped surface.

Ball Drop Force Loss testing composite of panels 200 including one, two, three and four of double-side flocked FEAM layers 210 determined that the greatest Force Loss was achieved when two or three layers were combined. Adding four (or more) FEAM layers 210 in certain embodiments did not result in a proportionally greater Force Loss increase. Therefore a two or three FEAM layer 210 (with dividers 120 between each of the FEAM layers 210) composite panel 200 is a cost effective layer combination.

There are several ways of fabricating a composite FEAM panel including: flocking fibers on a substrate to produce FEAM layers; processing a plurality of FEAM layers to provide breathability and flexibility; assembling the plurality of FEAM layers and at least one divider disposed between two adjacent FEAM layers in a stacked configuration; and interleaving at least one divider between adjacent flocked surfaces of two of the plurality of FEAM layers. The FEAM layer can be a single side, a double side FEAM layer or a combination of both. Further processing of the composite panel can include enveloping the FEAM layers (or the entire FEAM panel) in a fabric cover.

Figure 3:
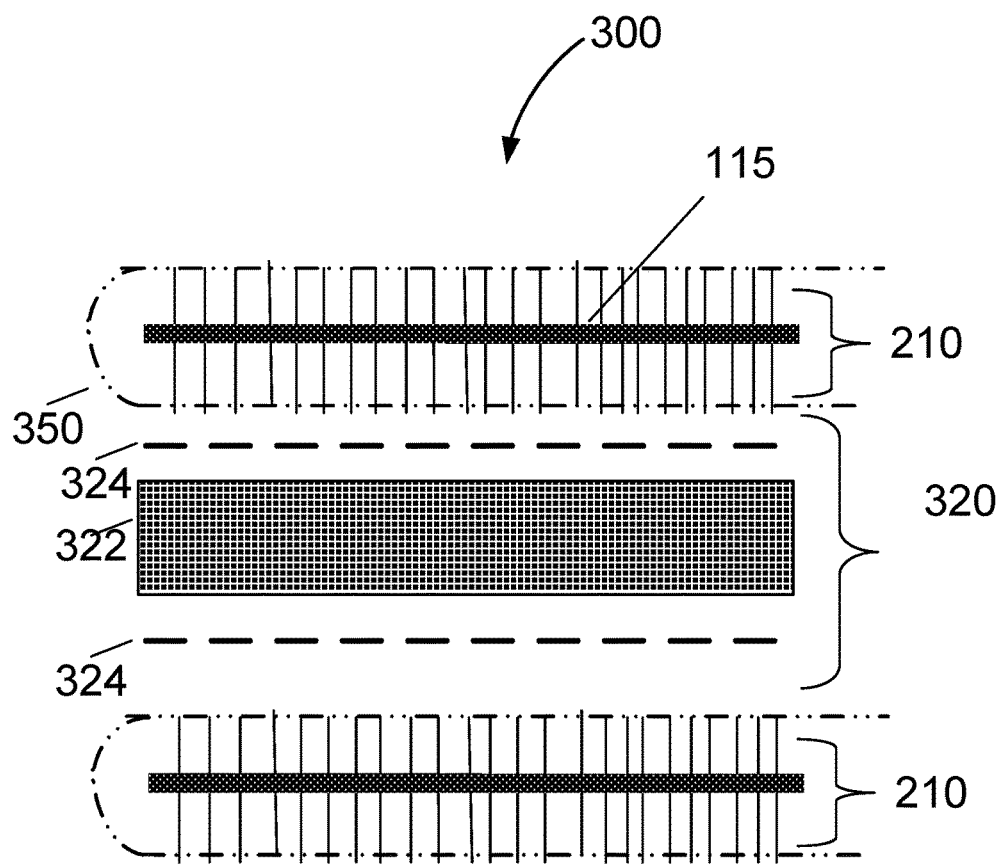
FIG. 3 is an exploded schematic diagram of an alternate embodiment of the composite panel of FIG. 2 with a foam layer divider and a FEAM layer with an outer wrapping fabric.

Now referring to FIG. 3, in one embodiment a composite panel 300 similar to panel 200 uses a foam layer as a divider 320. Here the double side FEAM layer 210 is at least partially covered by the outer wrapping fabric 220. In one embodiment the FEAM layer 210 and the foam divider 320 are joined together with rubber cement or other flexible adhesive. In one embodiment, the foam layer divider has a thickness of about 2 mm (1/16") to about 20 mm (3/4").

In another embodiment the FEAM layers 210 and the foam dividers 320 are joined together by over-wrapping/enveloping the completely panel 300 with a fabric cover. In this embodiment, there is no adhesive or bonding between the FEAM layers 210 and the foam dividers 320 of the energy absorbing panel 300 (i.e., the composite panel is held together by the integrity of the enveloping fabric wrap).

In one embodiment, the divider 320 includes a foam section 322, here perforated vinyl nitrile foam with 6.4 mm (1/4") perforations. The divider 320 can also include optional polyester fabric sheets 324 to cover the foam section 322 surfaces adjacent to the FEAM layers 210. This configuration is significantly light weight (low areal density) and has high impact energy absorption (EA) capabilities. It is understood that the outer wrapping fabric 350 may include a single material or multiple sections made of different materials (e.g., a napped outer surface fabric GT-758 manufactured by Gehring-Tricot Corp. and VelTex® manufactured by Velcro USA Inc. VelTex®) and can surround either completely or partially an entire panel or individual layers.

Ball Drop testing on the FEAM/FOAM layered composite panel 300 determined that striking the panel on the FEAM SIDE hit position (i.e., the FEAM side on top) produced a higher (through thickness) Force Loss percentage than the FOAM SIDE "hit" position. To provide equal side Force Loss percentage energy absorption, one embodiment includes FEAM layers 210 on both sides of the divider (e.g., a central foam layer).

Figure 4:
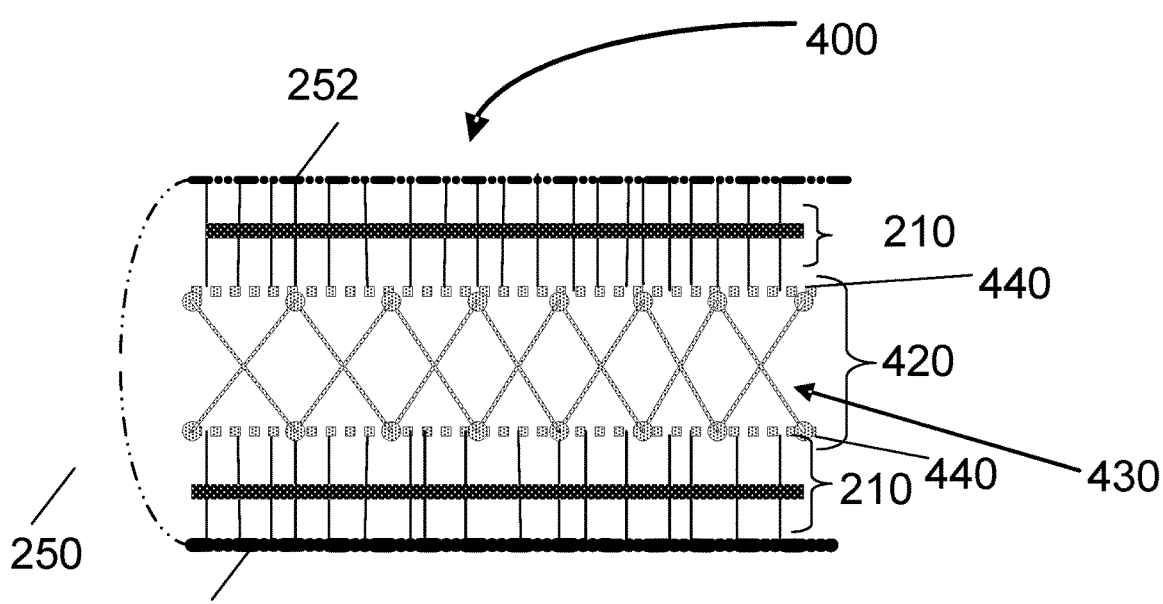
FIG. 4 is a schematic diagram of an alternate embodiment of the composite panel of FIG. 2 with a spacer fabric layer divider and a FEAM layer with an outer wrapping fabric.

Now referring to FIG. 4, in one embodiment a composite panel 400 similar to panel 200 includes a divider 420, here, a spacer fabric (e.g., a three dimensional textile structure). In one embodiment, the composite panel 400 is completely enveloped by the outer wrapping fabric 250 which can include multiple sections 252 and 254. The divider 420 includes a core 430 disposed between integrally attached outer layers 440. In other embodiments the divider includes, but is not limited to, a warp knitted spacer fabric (WKSF), a polyester WKSF, a polyamide WKSF, a thin polymer film fabric, a thin nonwoven fabric, a foam layer, a knitted spacer fabric, a Weft knitted spacer fabric or a woven spacer fabric, and a felt layer. The "synergistic effect" of enhanced energy absorbing properties is most pronounced in FEAM/WKSF (spacer fabric configurations) and some FEAM/Foam material "divider" layer combinations.

Spacer Fabrics are a specialized fabric structures fabricated by weaving, warp knitting and weft knitting. One of the most common types of Spacer Fabrics is a Warp Knitted Spacer Fabric (WKSF) that is made on a double-needle bar Raschel knitting machine. WKSF fabrics are three-dimensional textile structures including the integral outer layers 440 (an upper and lower planar fabric-like outer surface layers) that are joined together but kept apart by the core 430, of monofilament structural spacer yarns. These monofilament spacer yarns form an open "core" structure between the planar outer fabric-like surfaces of "pile" spring-like mono-filament cross members that have flexible compression properties. This core is also an open structure allowing for the more-or-less free passage of air and moisture giving the complete structure its higher breathe-ability or water vapor transmit-ability (WVT) compared to foam and other impact blunting materials.

In one embodiment, a versatile FEAM composite panel is provided by integrating the overall mechanical compression properties of the spacer fabric divider 420 with FEAM elements. Here, the integral outer layer of the spacer fabric is in a close enough knit of planar (small hole porosity) to act as the divider 420. In certain embodiments, the mechanical compression behavior of the FEAM panel can be "tuned" by adjusting the mechanical profile of the spacer fabric in each FEAM layer so that a "designable" smooth, load-deflection curve (in compression) is achieved.

In one embodiment, the outer wrapping fabric 250 include multiple sections 252, here, a napped outer surface fabric GT-758 manufactured by Gehring-Tricot Corp. and section 254, here, a VelTex® having an outer Velcro® loop structure manufactured by Velcro USA Inc. VelTex® is a laminar fabric with one side adapted to receive Velcro® hook fabric. This configuration is significantly light weight (low areal density), comfortable and has high impact energy absorption (EA) capabilities. It is understood that the outer wrapping fabric 250 can include multiple sections as shown here or may be a single fabric to completely or partially envelop the multiple layers and dividers. In this embodiment the divider 420 is a GT-730 Spacer Fabric open structure manufactured by Gehring-Tricot Corp.

Figure 5:
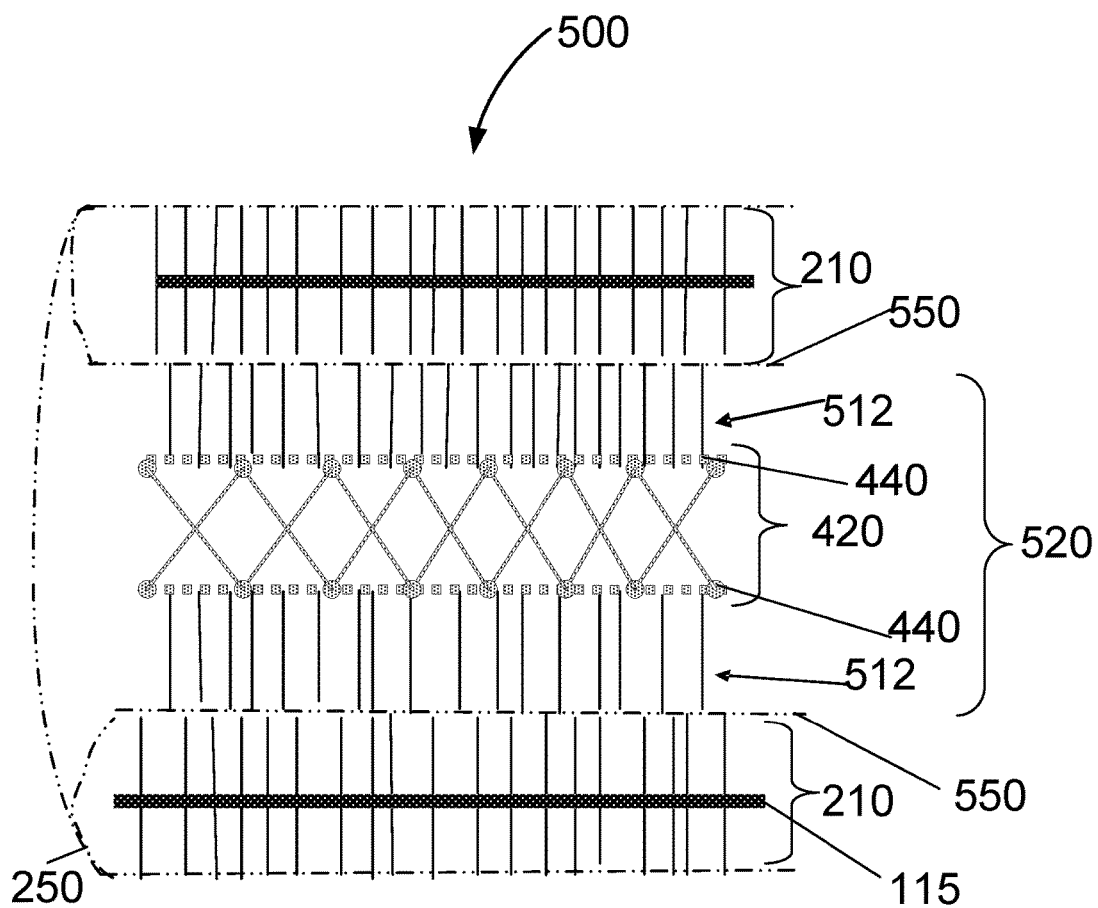
FIG. 5 is a schematic diagram of an alternate embodiment of FIG. 2 with a spacer fabric divider and an outer wrapping fabric.

Now referring to FIG. 5, in one embodiment a composite panel 500 similar to panel 400 includes a WKSF divider 520 where the spacer fabric divider 420 includes additional fibers 512 flocked on both sides of its planar fabric upper and lower outer surfaces 440. When this outer surface flocked WKSF structure is sandwiched between two double side FEAM layers, the flocked fibers 512 incorporated in the divider 5201 increases the springiness and therefore the EA properties of the combined composite panel 500.

Figure 6:
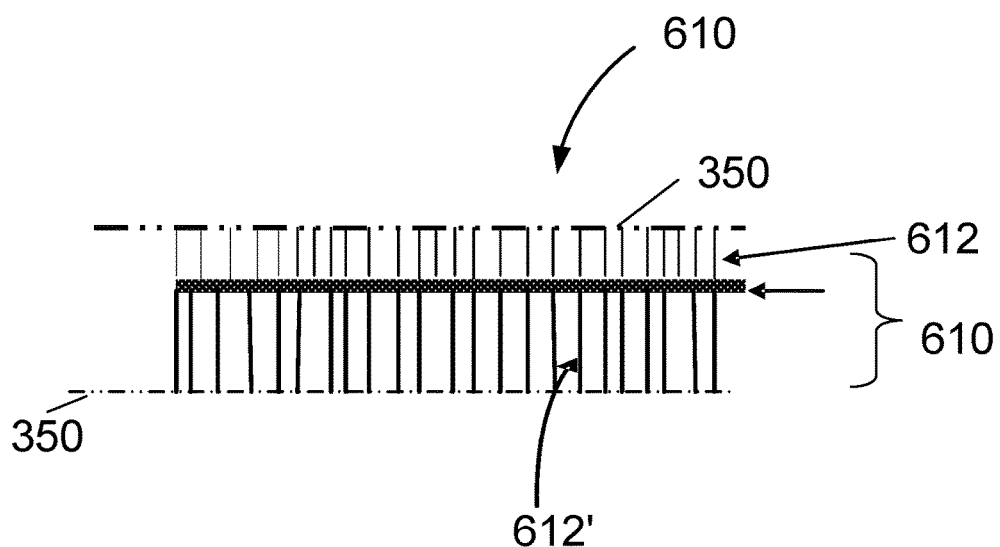
FIG. 6 is a schematic diagram of double side FEAM layer having different length fibers on opposite sides of the substrate in accordance with one example embodiment disclosed herein.

Now referring to FIG. 6, a FEAM layer 610 similar to FEAM layer 210 includes on one side of the substrate 115, a first multiplicity of lower denier, shorter, softer, more comfortable monofilament fibers 612 and on the other side, a second a multiplicity of higher denier, longer, stiffer monofilament fibers 612'. When combining FEAM layers and foam dividers or spacer fabric dividers it is advantageous to have the side of the FEAM that is in contact with the human body part (for cushioning and breathability comfort) be a soft and have a comfortable feel as possible. High denier (stiff, coarser) flocked FEAM surfaces have less contact comfort but better energy/force absorption. Lower denier (less stiff, softer) flocked FEAM surfaces have better contact comfort but lower energy/force absorption. To accommodate this feature in a FEAM layer, the FEAM layer is flocked on the more springy and energy absorbing side with a higher denier flock fiber (having a fineness of between about two and about 60 denier and the other softer and more skin touchable side with a lower denier flock fiber (having a fineness of between about one and about 10 denier). This different size of flock on each side of a double side flocked FEAM layer 610 (also referred to as a dual-size double side FEAM layer 610) design also works very well when combined with double-side flocked FEAM layers where the dual-size double side flocked FEAM layers are oriented in the resulting composite panel such that the softer, more comfortable-to-the-touch side of the dual-size double side FEAM layer(s) are oriented towards an outer surface of the composite panel.

The flexibility, breathability and pliability of any FEAM panel are improved by, needle punching, non-barbed needle punching, perforating and slitting as described below. The FEAM layers can be hole perforated as described in FIGS. 7A-7I, needle punched as described in FIG. 8A, slit as described in FIGS. 8B-8C. Separately or in combination with the operations on the FEAM layers, the dividers can be needle punched and the substrate of each of the plurality of FEAM layers can be perforated to improve flexibility, breathability and pliability of the FEAM panels.

Figure 7A:
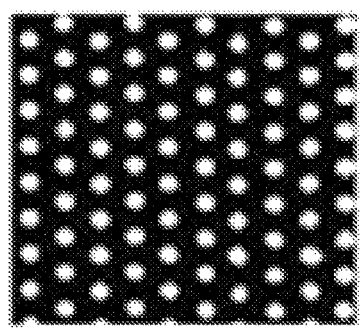
FIGS. 7A-7I are through-panel views of perforation patterns in FEAM layers in accordance with embodiments disclosed herein.
Figure 7B:
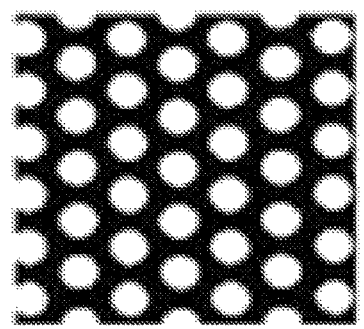
Figure 7C:
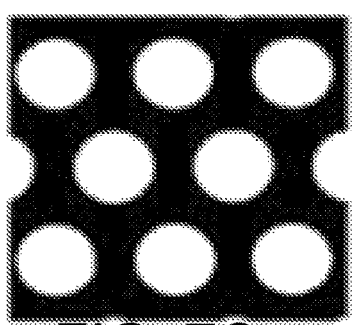
Figure 7D:
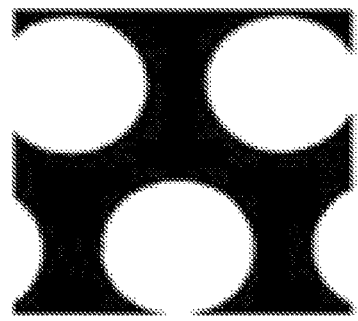
Figure 7E:
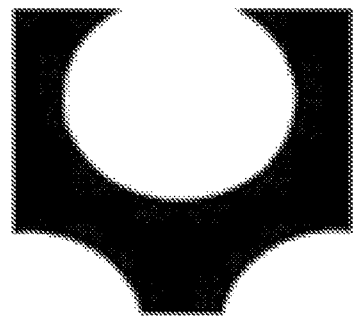
Figure 7F:
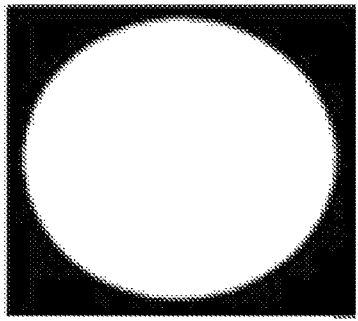
Figure 7G:
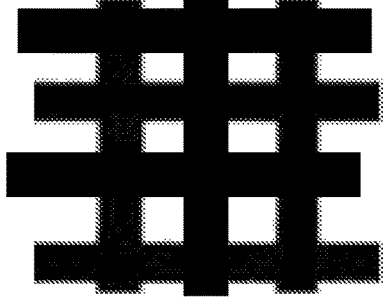
Figure 7H:
Figure 7I:
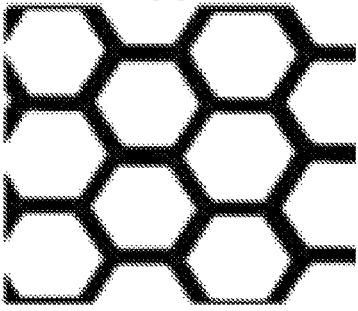

FIGS. 7A-7I illustrate exemplary perforation patterns which can be used in conjunction with the various FEAM layers described herein. One advantage of the perforated FEAM layers is that the FEAM layers are lighter in weight. In one embodiment, the areal density (weight/area) of the perforated FEAM is over 30% less than the non-perforated FEAM panel. Lower weight is an important property being sought for energy absorbing sport and military wearable padding applications. FIG. 7A illustrates a pattern 700 having perforations with about 1.6 mm (1/16") diameters on about 3.2 mm (1/8") centers. FIG. 7B illustrates a pattern 710 having perforations with about 3.2 mm (1/8") diameters on about 4.8 mm (3/16") centers. FIG. 7C illustrates a pattern 720 having perforations with about 6.4 mm (1/4") diameters on about 9.5 mm (⅜") centers. FIG. 7D illustrates a pattern 730 having perforations with about 12.7 mm (½") diameters on about 17.5 mm (¹¹⁄₁₆") centers. FIG. 7E illustrates a pattern 740 having perforations with about 19.1 mm (¾") diameters on about 25.4 mm (1") centers. FIG. 7F illustrates a pattern 750 having perforations with about 25.4 mm (1") diameters on about 31.75 mm (1.25") centers. FIG. 7G illustrates a pattern 760 having rectangular perforations. FIG. 7H illustrates a pattern 770 having slotted perforations. FIG. 7I illustrates a pattern 780 having honeycomb perforations. Perforations having a square, rectangular, oval, triangular and/or hexagonal geometry are also useful perforation geometries for these FEAM layers. In one embodiment, the perforations are made in a staggered pattern with less than about 12.7 mm (½") separation and having a diameter less than about 6.4 mm (¼"). In embodiments, having "open areas" of than 30 percent the EA properties and dimensional stability of the FEAM panel is somewhat reduced.

In contrast to needle punched FEAM layers (described below), FEAM layers having "shaped" perforations or perforations through their structure result in FEAM layered structures that have higher Force Loss (%) to areal density and volume density ratio properties than un-perforated FEAM layers. These perforated FEAM layers have enhanced three-dimensional breathability. The perforations in these perforated FEAM layers can be round, oval, square or triangular. In one embodiment, the perforated area (open area) in a FEAM layer does not exceed 25 percent of the total cross sectional area and in another embodiment does not exceed 30 percent. Also, the perforations should be at least an average perforation diameter distance away from adjacent perforations. Too high an "open area" of these perforated sheets results in a diminution of the panel's energy absorption during an impact hit. Material sheet perforation is accomplished manually by mechanically punching, using a shaped metal cutting die and hammer punch assembly. Sheet material hole punching is also done commercially using a reciprocating punch press and the like as is known in the art.

Figure 8A:
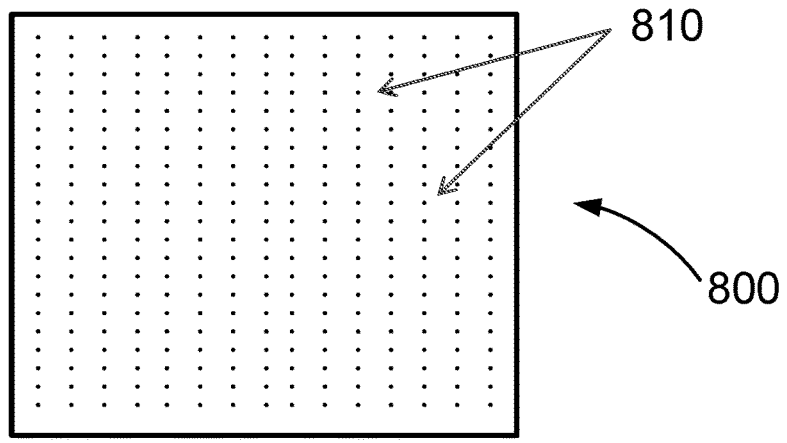
FIG. 8A is a through-panel view of a needle-punched pattern in FEAM layers in accordance with embodiments disclosed herein.

Now referring to FIG. 8A, an exemplary pattern 800 includes openings 810 made by a needle punching process which may be applied to a completed composite panel 100, 200, 300, 400, etc. or individually to FEAM layers 110, 210, etc., substrate 115, and dividers 120, 320, 420, etc. In some embodiments, composite panel 100 elements are through-the-panel needle punched. This process is a positive way of introducing three-dimensional breathability into the composite panel. In one embodiment, sewing machines without thread can be used for needle punching and in other embodiments commercial needle punching machines are used. It is understood, that while FIG. 8A depicts a regular needle punching pattern, other patterns, for example, a random needle punch pattern can be used. It is understood that needle punching can employ either barbed needles (for dry non-woven webs) of non-barbed needles for other fabrics and materials.

Figure 8B:
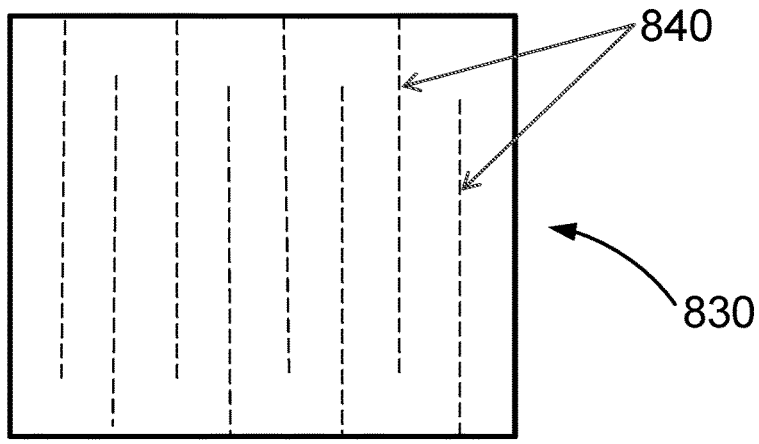
FIGS. 8B and 8C are representative through-panel views of slit patterns in FEAM layers in accordance with embodiments disclosed herein.

Now referring to FIG. 8B, an exemplary pattern 830 includes openings 840 made by a slitting process which may be applied to individual FEAM layers 100, 200, 110, 210, etc. It has been found that putting multiple slits in these FEAM panel elements makes the panel much more directionally flexible. Flexibility is important for the "fit and comfort" of the garments including FEAM panels. Various forms of multiple slit configurations have been tested, and in some embodiments the slitting pattern depends on the bending directionality needs of the product which includes the FEAM panel. It is understood that other slitting (or cutting) patterns (length, direction, shape, curvature) are possible. Slitting can be accomplished manually or by means of a fabric slit punching or cutting machine as is known in the art.

Figure 8C:
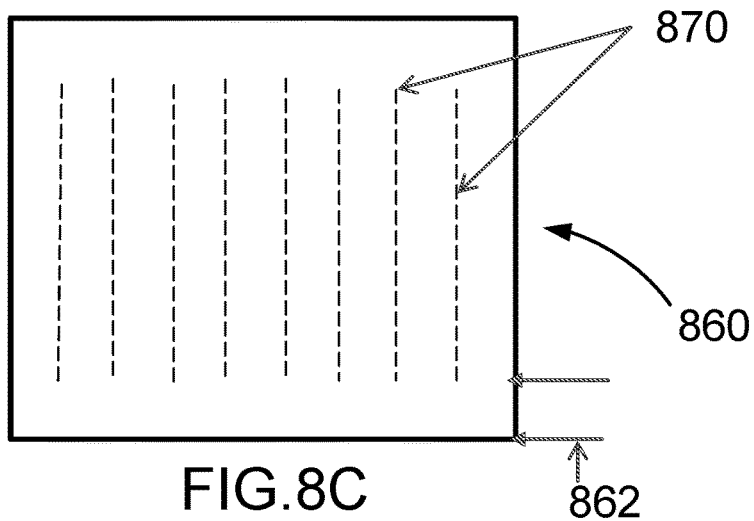

Now referring to FIG. 8C, an alternate pattern 860 includes openings 870 made by a slitting process. Here, in slit pattern 860, the slit openings plurality of slits in at least one of the plurality of FEAM layers, the plurality of slits are spaced apart from a perimeter edge 862 of the panel do not go through to the edges. This pattern maintains greater dimensional stability relative to pattern 830. It has been observed that these "inner-ply-slit" FEAM layers form FEAM panels are more flexible and pliable in the across-the-slits direction than non-slit panels. These slit containing samples feel much softer and pliable especially when bending the FEAM panel with slits perpendicular to the direction of the slits. This feature is an important consideration in the design and practice of creating FEAM containing panels for helmet pad and other body armor apparel applications. From an energy absorbing (EA) perspective, it has been shown that slitting does not profoundly alter the EA properties of FEAM layers and panels. It was found that FEAM panel slitting greatly improves the flexibility and conformability of these stacked FEAM structures. This is an important factor in the practice of designing EA helmet and body pads. Slitting of inner FEAM panels in multilayer FEAM configurations does not significantly reduce the EA properties of the FEAM assembly. However, the flexibility and conformability of FEAM panels comprising multi-ply (i.e., multiple FEAM layers with dividers (e.g., fabrics or sheets) are greatly improved by slitting.

In bodily impact and mechanical hit situations, in sport and military functional activity, there is a need to detect the intensity and direction of a particular impact in say helmets or in body protection apparel. Piezoelectric fabrics or films can be used as dividers or in conjunction with dividers to provide as a sensitive motion and force sensors to detect impacts. In the operation of piezoelectric sensors, mechanical deformation of the piezoelectric layer is converted into an electric signal which can be electronically detected and processed by standard sensor network hardware and software. The same could be done with pyro-electric fabrics of film which with changes in temperature generate an electronically detectable signal.

Embodiments described below include electro-active materials (EAM) (e.g., piezoelectric materials and electro-active flock materials) in several configurations. These configurations include, for example, combinations of EAM (fibers, yarns, films or fabrics) as dividers and FEAM layers and combinations using electro-active fibers incorporated directly into or as the flocked material fibers. The electro-active materials are an integral part of the sensing material structure or device. These systems are referred to generally as flocked electro-active sensor (FEAS) materials. The flocking of piezoelectric fibers as the flock fibers in constructing a FEAM layer is an example where the electro-active fibers are integrated into a FEAM structure. Such a panel has the combined features of energy absorption and electronic sensing capabilities.

Figure 9A:
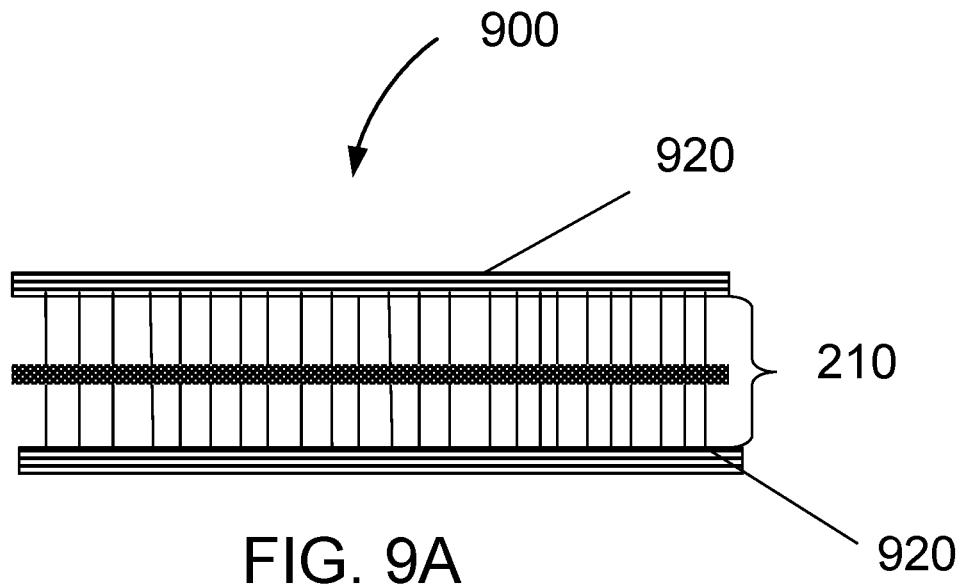
FIGS. 9A and 9B are schematic diagrams of alternate embodiments of the composite panel of FIG. 2 with a piezoelectric divider in sheet form in accordance with example embodiments disclosed herein.
Figure 9B:
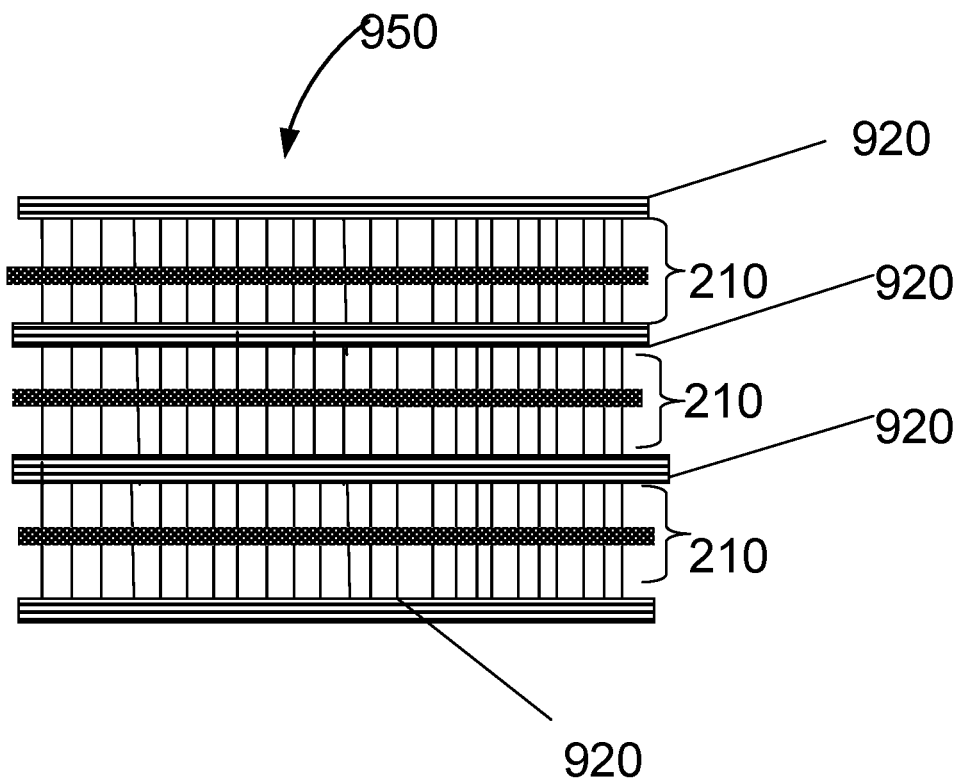

Now referring to FIG. 9A, a panel 900 includes a double side FEAM layer 210 and at least one divider 920 which includes a flexible, electro-active material (EAM) layer. Additional piezoelectric layers can be added for signal amplification. In operation, the divider 920 acts as a signal generator when deformed or flexed. Now referring to FIG. 9B, composite panel 950 (also referred to as a high sensitivity layered sensor system 950) includes four flexible piezoelectric dividers 920 combined with FEAM layers 210. Multiple interleaved piezoelectric dividers 920 provide a high signal (effectively amplifying the signal generated upon deformation or flexing of the panel 950). It is understood that the piezoelectric dividers 920 can be combined with other dividers (e.g., foam or spacer fabric) to optimize the resulting composite panel for a particular application.

The material combination of FEAM material and layers of fabric or film piezoelectric layers is readily adaptable to the field of impact energy material layers that can generate an electrical signal when it is struck by a mechanical impact. In this embodiment, the piezoelectric fabric or film is employed as an add-on layer to existing FEAM layers. In other embodiments, a flexible piezoelectric fabric is used as the substrate (e.g., center support ply) of the FEAM layers.

In other embodiments, FEAM panels include configurations where the piezoelectric signal generating layer (PEL) materials are integrated directly into the FEAM layers. Here short piezoelectric fibers are the flock fibers that are included in composite panel. The piezoelectric flock fibers included in the FEAM layer serve at least two functions: absorbing impact energy as well as detecting impact hits by producing an electrical signal when mechanically deformed by the (compression) impact. These FEAM panels can also serve as energy generating layer devices. For example placing a FEAS FEAM layer in a running or marching shoe would generate electrical energy by walking or running. A person's foot pressure would generate electrical energy that could be stored in an energy storage device (e.g., a battery or a super capacitor).

Figure 10A:
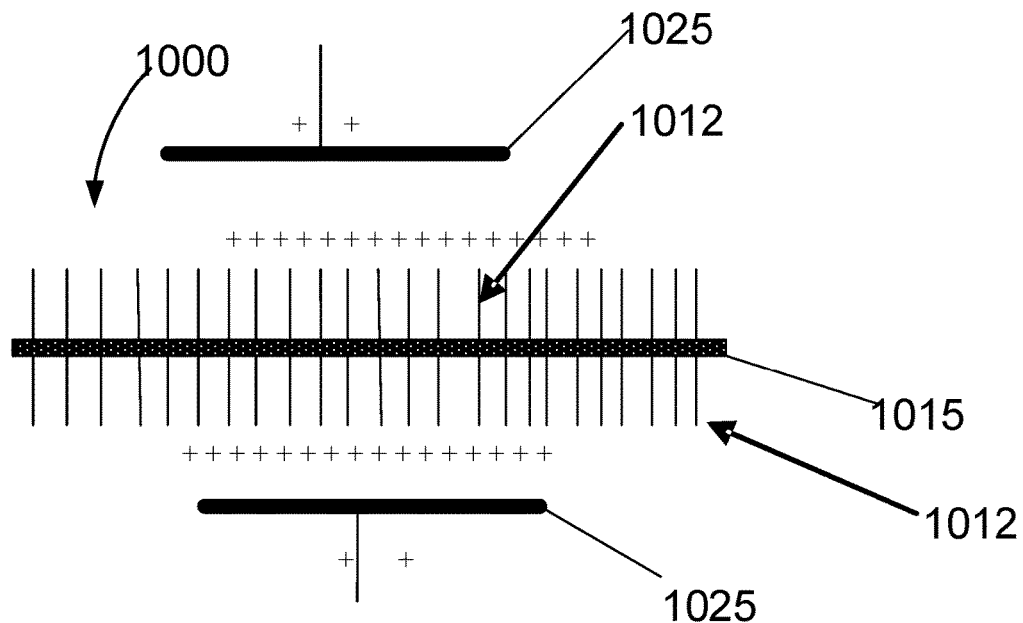
FIG. 10A is a schematic diagram of a piezoelectric FEAM layer using flocked piezoelectric fibers undergoing corona discharge poling in accordance with example embodiments disclosed herein.

Now referring to FIG. 10A, a piezoelectric FEAM layer 1000 includes piezoelectric fibers 1012 and a conductive fabric/film substrate 1015. After flocking the piezoelectric fibers 1012 onto the conductive fabric/film substrate 1015, the FEAM layer 1000 undergoes corona discharge poling or other poling methods. The poling process renders the FEAM layer 1000 piezoelectric. It is understood that different polarities and different methods of poling the fibers can be used. In one embodiment, the piezoelectric fibers 1012 are, for example, polyvinylidene fluoride (PVDF), poly (vinylidenefluoride-trifluoroethylene) copolymer (P (VDF-TrFE)) or lead zirconate titanate (PZT) fibers. The FEAM layers are poled in place (using corona discharge poling or other methods) to render the FEAM layers and therefore the composite panel piezoelectric.

Figure 10B:
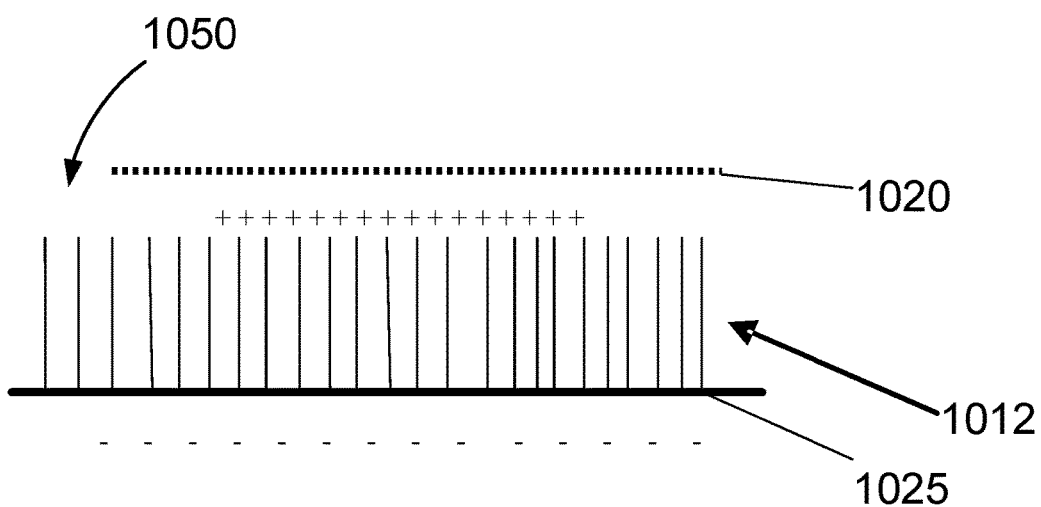
FIG. 10B is a schematic diagram of a piezoelectric FEAM layer using piezoelectric flock fibers in accordance with example embodiments disclosed herein.

Now referring to FIG. 10B, a FEAM layer 1050 include piezoelectric fibers 1012 which have been poled in a process similar to the process described above in conjunction with FIG. 10A. Here the substrate 1025 (e.g., a central support ply) of the FEAM layer is chosen to be a material that is electrically conducting to facilitate measurement of the piezoelectric signals resulting from the deformation of a FEAS panel upon impact.

Another flexible and electrically conductive component 1020 (also referred to as electrode 1020) serves as an electrode to measure the piezoelectric signal. Electrode 1020 can act as a divider or be used in conjunction with a divider. The piezoelectric FEAM (FEAS) layer can be double-side or single side.

In operation electrode 1020 is connected to a one pole (e.g., positive or negative) of an electrical circuit (not shown) used to measure the piezoelectric signal generated on an impact deformation and the electrically conductive substrate 1025 is connected to a pole with the opposite polarity. Here, electrode 1020 is the positive side of the circuit and the electrically conductive substrate 1025 is the negative side of the circuit. Electrode 1020 is part of the circuit to detect the piezoelectric pulses that would be generated by the mechanical deformation of the FEAM layer 1050. The signals processed in by the detection circuit are read and interpreted by additional instrumentation (e.g., electronic signal measurement devices and/or signal transmitting devices located either externally or internally to the composite panel). In these embodiments, the FEAM layer 1050 becomes the electro-active element sensor. These electro-active FEAM layers also have some degree of energy absorption.

One embodiment combines FEAM fibrous energy absorbing layers with the piezoelectric sensing technology in the form of piezoelectric FEAM layers or dividers to provide an integrated energy absorption and impact intensity monitoring system. This integrated system can be included as standard equipment in contact sport helmets (and apparel body pads and the like). These electro-active FEAM embodiments would enable detection of injury using a very light weight, detecting and impact event recording system. The impact event recording system would include the steps of detecting, recording and storing helmet impact intensity and number of events over the course of a player's game activity.

This information can be wirelessly transmitted to the medical staff on the sidelines for evaluation/assessment throughout the game. If the Impact "Hit" intensity goes over a certain "threshold," the player would be physically examined and if needed would be removed from the game. Finally, the head impact "History" of a Player would be kept on file. It could be used to assess the player's potential accumulated repetitive traumatic brain injury (TBI) condition and events as interpreted by medical guidelines to determine if the player can continue to play in a game.

Figure 11A:
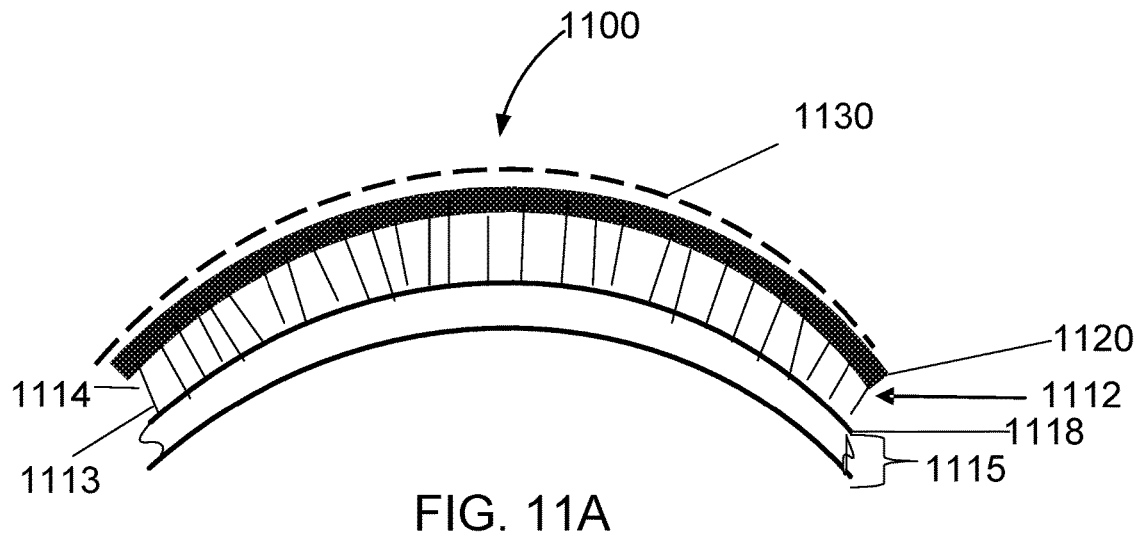
FIGS. 11A and 11B are schematic diagrams of composite panels applied to hard tough plastic helmet shell in accordance with example embodiments disclosed herein.

Now referring to FIG. 11A, an integrally flocked, impact absorbing outside covering system for a sport helmet 1100 includes a helmet shell 1115 having an outer surface 1118, a plurality of flock fibers 1112 having first ends 1113 disposed on the outer surface 1118 of the helmet shell 1115 and second ends 1114, a flexible sheet 1120 that is impregnated with an abrasion resistant coating at least partially covering the second ends 1114 and a low friction surface coating 1130 disposed over the abrasion resistant coating on the flexible sheet 1120. In other embodiments, double side FEAM layers can be used. During construction of one embodiment, flock fibers are applied directly to surface of helmet shell 1115.

Figure 11B:
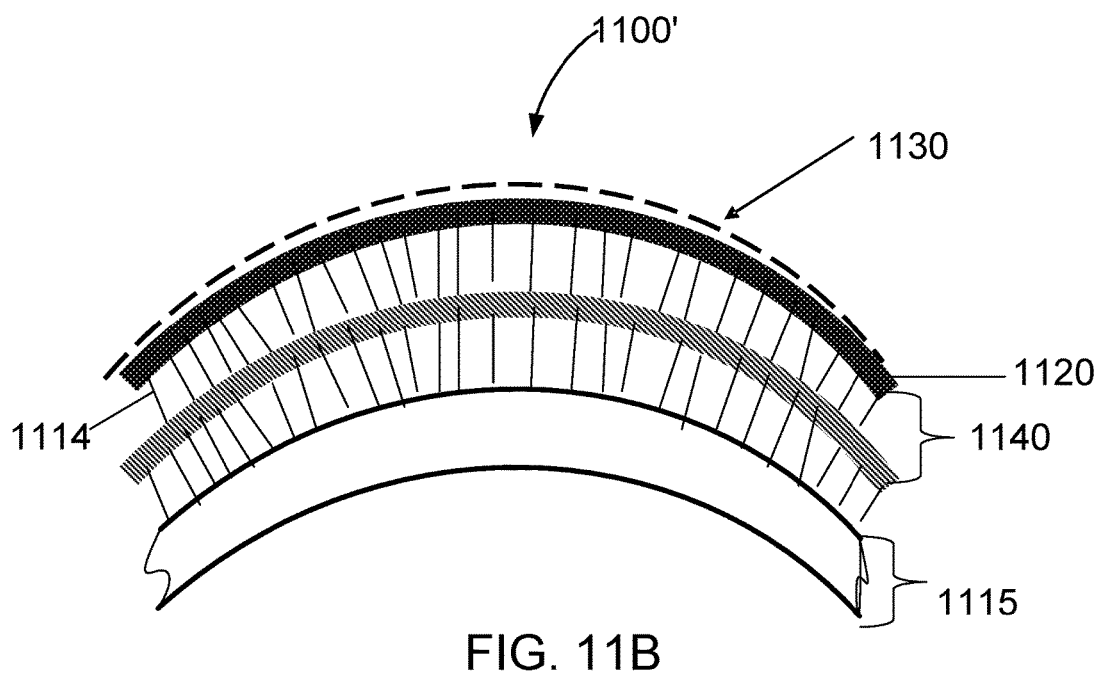

Now referring to FIG. 11B, an integrally flocked, impact absorbing outside covering system 1100' for a sport helmet similar to system 1000 includes an additional FEAM outer layer 1140. Here, second ends 1114 are disposed next to the flexible sheet 1120 that is impregnated at the tips of the flock fibers with an abrasion resistant coating at least. Applying the abrasion coating or layer to the tips of the FEAM layer flocked surface allows the flock layers to retain their energy absorbing spring action. In these embodiments, the FEAM layers show impact blunting properties in the context of the smooth "spring action" of compressing perpendicularly oriented, semi-stiff short textile fibers. These configurations facilitate the use of fibrous energy absorbing materials for sport helmet pad and protective apparel. Here, the low strain rate compression stress/strain behavior of FEAM layers is found to be a smooth continuous stress-strain pattern. This smooth deformation behavior is completely unlike a FOAM's or Spacer Fabric's compression deformation behavior. These materials always exhibit an initial low strain level "stress hump" which is characteristic of their viscoelastic nature or fibrous structure. A FEAM's compression behavior is based solely on a FEAM's unique energy absorbing mechanism; the spring action of short (nominally) perpendicularly oriented short fibers during a compression loading. As a final indication of the merits of FEAM materials compares the compression stress-strain behavior of a typical FEAM/FOAM layered assembly. The added FEAM element is capable of reducing the initial low strain level stress-hump region of the compression load-deflection curve. It is understood that various configurations and components (e.g., single side FEAM layers, double side FEAM layers, different dividers and covering fabrics can be used to optimize the high impact blunting capabilities of the covering systems.

While this smooth impact blunting feature applies to inside the sport helmet padding, this Flock Cushioning Effect should also apply if the perpendicularly oriented flock fibers are fixed to the outside of the sport helmet. If an outside of the helmet coating of flocked fiber were present, in an especially helmet-to-helmet collision of two similarly coated helmets, the resulting mechanical impact will be highly blunted by the Energy Absorbing action of the flocked outside-the-helmet layers.

Certain embodiments disclosed herein apply suitably stiffer and longer long flock fibers to the all or part of the outer surface of a sports helmet such as a football helmet. This flocked layer will then be surfaced by a thin layer of fabric, such as stretchable fabrics made of elastomeric yarns (e.g., Spandex). This stretchable fabric layer is then coated with a tough flexible polymeric coating leaving the helmet with a tough resilient, impact energy absorbing composite "skin" layer. The helmet's composite "skin" layer is then surfaced with a fluorocarbon material layer to greatly reduce the friction of the helmet's total surface. In yet another embodiment the flocked upon outside of the helmet surface is covered with a tough shrink-wrap type plastic film. In one embodiment, friction reducing surface treatments are applied to the covering (e.g., shrink-wrap film) which covers the flock fibers.

In this embodiment, the flock fibers are stiff enough and long enough to accommodate a reasonably good deformation strain during compressive impact. To accomplish this in one embodiment, the flock fibers are in the range of 20 to 60 denier polyester or nylon fibers and from about 1.52 mm (0.060") to about 5.08 mm (0.200") long. In a further embodiment, an energy absorbing polymer (fluid or gel) is added get to the Flocked (internal) volumetric section of this covering system. Energy absorbing polymeric gels (like polyethylene glycol fluid, silicone gels and the like) will greatly enhance the impact energy absorbing capabilities of this novel outside the football helmet impact energy absorbing system. The use of fluid to further enhance the impact energy absorbing performance of any or all FEAM materials is also possible. In other embodiments, the flocked fibers do not cover the entire surface of a helmet but are applied as patches on the helmet.

It is understood that in some embodiments only portions of a football helmet or other protective device need to be flock coated to provide the energy absorbing benefits. In some embodiments, only small sections of a football helmet are needed for impact "hit" protection. In these embodiments, shaped flocked strips of FEAM-Like elements are used as an additive coating. Bonding of these strips as "add-ons" employs a durable hot melt or otherwise a strong pressure sensitive adhesive system so that abrasion and peeling off of these FEAM elements strips from the helmet's surface are minimized. These shaped individual FEAM strips or patches could be used as add-on (the outside of the helmet) adaptable contact hit-blunting patches. These impact blunting patches would be positioned on the outside of the helmet at the discretion of the team's equipment manager, team physician, coach or the players themselves.

In one embodiment, the outside FEAM structure includes a stress hardening fluid which enhances impact energy reduction capacity. In another embodiment using a layered construction, the outside of a sport (football) helmet is flocked with fibers of the appropriate geometry and material, for example: 1 to 6 mm long, 20 to 60 denier, Nylon or Polyester. This flocked surface is then be covered by fabric or film membrane material so the outward ends of the surface/ends of this fibrous flocked array are locked in place. In this embodiment, a spandex like stretchable knitted cap fabric would serve to do this. With this overall covering of the flock fiber ends, the flock fibers would then be able to more broadly and evenly (area-wise) participate in distributing the impact strike's force against the helmet. Next, this "membrane" covered flocked helmet is coated with a tough, durable resilient coating that will serve to seal the membrane cover fabric so that it is protected from the elements. This overall coating is also designed to a have a low coefficient of friction so as to reduce the contact friction of the flocked helmet during helmet-to-helmet contact sports action. In some embodiments, the overall thickness of this "cover/coating" encapsulated flock fiber energy absorbing helmet outer layer system should be between about 1.5 mm to about 9.5 mm thick. In another embodiment, the open space between the flock fibers in this layered construction is filled with an energy absorbing gel/fluid material. This thin "impact absorbing gel" (e.g., silicone) layer would be sealed into the flocked coating system. This would give the flocked energy absorbing system an extra added energy absorbing capability. Coupling this invented outside-the-helmet impact energy absorbing covering system with the existing energy absorbing inside-the-helmet pad material we provide the maximum impact/strike protection for the helmet wearer.

From the foregoing it will be appreciated that the invention provides a new type of energy absorbing padding material described as panels and panel configurations and constructions adapted to cushion or blunt mechanical impact loads. Depending on the application, panels in accordance with the invention may be used by themselves as a primary protective element or in conjunction with other energy absorbing devices and energy absorbing layer materials. The composite panels may be used individually or in combination with other energy absorbing layered materials to achieve the desired energy absorption properties. The panels may be of lightweight, non-bulky construction suitable for use in protective garments or sports equipment. The panels are lightweight and are easily manufactured at low cost. In addition to the impact absorbing features of the invention, the panels can breathe and thereby enhance user comfort. The principles of the invention may be incorporated in various combinations of support ply configurations. The energy absorbing fibers serve as tiny spring like spacer elements. In order to enhance the frictional characteristics of the fibers they may be treated with a friction-enhancing sizing. Embodiments may include a single or multilayer sandwich configuration with the fibers ends separated with a divider (e.g., fabric, sheet, foam, spacer fabric or film) and covering the assembly of elements of the sandwich with a soft and smooth outer surfaced covering fabric.

It should be understood, however, that the foregoing description of the invention is intended to be merely illustrative thereof and that other embodiments, modifications and equivalents may be apparent to those skilled in the art without departing from the principles of the invention.

The invention claimed is:

1. A flexible, fibrous energy managing composite panel comprising:
   a plurality of Flocked Energy Absorbing Material (FEAM) layers, each layer comprising:
   a substrate having a first surface;
   a first multiplicity of monofilament fibers, each having a first end and a second end, each of the first multiplicity of monofilament fibers being attached, at their first ends to the first surface of the substrate with the second ends of the first multiplicity of monofilament fibers extending away from the first surface of the substrate and remaining loose; and
   at least one divider disposed between the loose second ends of the first multiplicity of fibers of each of two adjacent layers of the plurality of FEAM layers to prevent the intermeshing of the loose second ends of the first multiplicity of fibers of each of two adjacent layers of the plurality of FEAM layers.

2. The panel of claim 1, wherein the substrate comprises one of:
   a polyester nonwoven fabric;
   a polyamide nonwoven fabric;
   a woven polyester fabric;
   a woven polyamide fabric;
   a knitted polyester fabric; and
   a knitted polyamide fabric.

3. The panel of claim 1 further comprising an outer wrapping fabric disposed to cover a surface of at least one of the plurality of FEAM layers, the outer wrapping fabric comprising one of:
   a woven polyester fabric;
   a woven polyester fabric having at least one napped surface;
   a woven polyamide fabric having at least one napped surface;
   a knitted spacer fabric having at least one napped surface;
   a woven spacer fabric having at least one napped surface;
   a polyester fabric with having at least one terrycloth surface; and
   a polyolefin fabric having at least one napped surface.

4. The panel of claim 3 wherein the outer wrapping fabric comprises a smooth surface disposed towards a wearer of the panel.

5. The panel of claim 1, wherein at least one of the plurality of FEAM layers further comprises a second multiplicity of monofilament fibers, each having a first end and a second end, the second multiplicity of monofilament fibers being attached, at their first ends to a second surface of the substrate with the second ends of the fibers extending away from the second surface of the substrate.

6. The panel of claim 5 wherein the second multiplicity of monofilament fibers have at least one of:
   a different length than the first multiplicity of monofilament fibers; and
   a different denier than the first multiplicity of monofilament fibers.

7. The panel of claim 1, wherein the first multiplicity of monofilament fibers each have a fineness in a range of about 1 denier to about 60 denier and a length between about 0.5 mm to about 12 mm.

8. The panel of claim 7, wherein the first multiplicity of monofilament fibers comprise one of:
   polyamide fibers;
   polyolefin fibers; and
   polyester fibers.

9. The panel of claim 1 further, wherein the at least one divider comprises a, electro-active material (EAM) layer.

10. The panel of claim 1, wherein the first multiplicity of monofilament fibers in at least one FEAM layer comprises electro-active material (EAM) fibers.

11. The panel of claim 1, wherein the divider is one of:
    a polyester woven fabric;
    a polyamide woven fabric;
    a nonwoven fabric;
    a foam layer;
    a knitted spacer fabric;
    a woven spacer fabric;
    warp knitted spacer fabric (WKSF);
    a polyester WKSF;
    a polyamide WKSF;
    a Weft knitted spacer fabric; and
    a felt layer.

12. The panel of claim 1, wherein the substrate includes a plurality of perforations and wherein an area of the plurality of the perforations is less than about 30 percent of the area of the substrate.

13. The panel of claim 12, wherein the perforations are disposed in a staggered pattern with less than about 12.7 mm separation and have a diameter less than about 6.4 mm.

14. The panel of claim 1, wherein each of the plurality of FEAM layers is needle punched to perforate the substrate.

15. The panel of claim 1, further comprising a plurality of slits in at least one of the plurality of FEAM layers, the plurality of slits spaced apart from a perimeter edge of the panel.

16. The panel of claim 1, wherein one of the plurality of FEAM layers has a substrate comprising an outer surface of a helmet shell outer surface, second ends covered by a flexible sheet that is impregnated with an abrasion resistant coating and a low friction surface coating disposed on the abrasion resistant coating on the flexible sheet.

* * * * *